July 2, 1935.  A. POULSEN  2,006,719

CONSTANT SPEED FILM FEEDING MECHANISM

Filed Aug. 19, 1931

Inventor:
Arnold Poulsen
By Emil Bonnelyche
Attorney

Patented July 2, 1935

2,006,719

UNITED STATES PATENT OFFICE 2,006,719

CONSTANT-SPEED FILM-FEEDING MECHANISM

Arnold Poulsen, Hellerup, Copenhagen, Denmark, assignor of part interest to Axel Carl Georg Petersen, Copenhagen, Denmark Application August 19, 1931, Serial No. 558,159
In Germany September 1, 1930

5 Claims. (Cl. 271—2.3)

In the recording of sound waves on a moving film and in the reproduction of sounds, which are recorded on a film, it has previously been proposed to maintain a constant speed of movement of the film during the recording or reproduction by means of a fly-wheel, which is in driving connection with the film.

In order to avoid the rate of velocity of the fly-wheel exceeding a certain limit, it has further been proposed to apply a brake, which is intermittently coupled to the driving mechanism of the fly-wheel, when the speed of revolution of same increases beyond a predetermined value.

It has also been proposed to apply a brake which constantly counteracts the movements of the film and is coupled to a separate roller over which the film is passed. This brake serves the purpose of keeping tightened the portion of the film travelling through a sound gate located between the said roller and the point where the fly-wheel is in driving connection with the film. The friction between the sound gate and the film acts upon the said portion of the film as a braking effect, which varies as the speed of the film varies and, consequently, should to some degree compensate irregularities in the motion of the film caused by irregularities in the driving effect. In practice, however, this compensation is very incomplete, because the said friction effect, due to the presence of dust, etc., in the gate, is not uniform even if the speed of the film is constant.

The present invention relates to systems for maintaining constant the speed of movement of a sound film by means of a fly-wheel in which the motion of the film is constantly counteracted by a brake and according to the invention the retarding effect produced by the said brake is utilized for the purpose of suppressing periodic vibrations of the fly-wheel and the portion of the film travelling towards the point of illumination without the utilization for the said purpose of any friction in a sound gate. To this end the point of illumination of the film is in well-known manner situated at the periphery of a rotary film-driven roller over which the film is passed—wherefore the invention is limited to systems in which this arrangement appears—and according to the invention the brake is coupled either to the last-mentioned roller or to a separate roller, which is driven by the passage of the film over same and engages the portion of the film travelling onto the former roller.

The brake device may be an ordinary friction brake, a rotary air or oil-brake, for example a fan rotating in air or oil, or one or more fans mounted on the fly-wheel shaft, or, finally, an eddy-current brake.

For the purpose of bringing out more clearly the distinguishing feature of the present invention, reference will be made in the following description to devices illustrated in the accompanying drawing wherein.

$a$ is a film and $b$ is a fly-wheel coupled to a roller $c$ around which the film $a$ passes. The film is moved in the known manner by toothed sprockets $d^1$ and $d^2$ in the direction indicated by the arrows.

Figure 1:
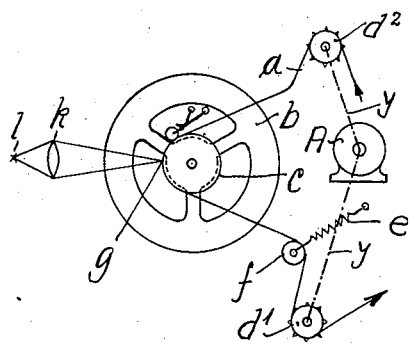
Figure 1 shows, in elevation, a speed regulating device, according to the prior art, in which the fly-wheel is driven by the film and coupled to the roller at the periphery of which the point of illumination of the film is situated.

In the constructions shown in Fig. 1, an intermediate member $f$ of known type and actuated by a spring $e$ is used for equalizing the variations in the speed at which the film is driven by the driving sprocket $d^1$. If desired several intermediate members of this type may be used. The film is illuminated at the sound control point $g$ by means of a source of light $i$ and a lens $k$.

In the constructions shown in Fig. 1, the roller $c$, and thus the fly-wheel, is driven by the passage of the film $a$ over the roller $c$, but if desired the fly-wheel may be coupled to the driving mechanism, which drives the sprockets $d^1$ and $d^2$ by means of a proper resilient clutch.

Figure 2:
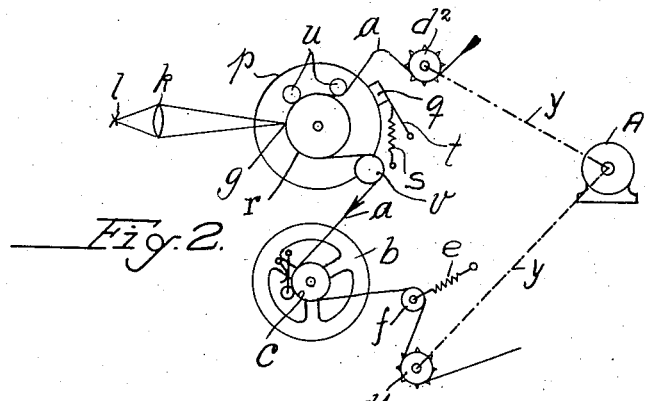
Fig. 2 shows in elevation a form of construction of a speed-regulating device constructed in accordance with the present invention.

In the construction shown in Fig. 2 in which the fly-wheel, by way of example, is also assumed to be driven by the film, the point $g$ at which the film is illuminated for recording and reproducing purposes is situated at the periphery of a separate roller $r$ and is pressed against this roller by means of rollers $u$. From the roller $r$ the film passes around a guide roller $v$ and then around the roller $c$. The brake $p$, $q$, $t$, $s$ produces a braking action, which replaces the friction set up by the passage of the film through the sound gate in the above-mentioned known construction, and the braking action is adjusted in such a manner that it restrains periodical oscillations of the system comprising the fly-wheel and the portion of the film travelling towards same.

As stated above, the brake $p$, $q$ may be replaced by braking devices of various other constructions.

Instead of connecting the brake $p, q$ to a separate roller $r$, the brake may be connected to the fly-wheel shaft itself or, what amounts to the same thing, to the shaft of the roller $c$ in Fig. 1.

Having now particularly described and ascertained the nature of my said invention and in what manner the same is to be performed, I declare that what I claim is:—

1. Mechanism for feeding a sound film past a light beam comprising two toothed sprockets for propelling the film; a motor for driving said sprockets; between said sprockets a roller and a separate flywheel both driven by the film and independent of said motor, and a brake restraining said roller.

2. Mechanism for feeding a sound film past a light beam comprising two toothed sprockets for propelling the film, a motor for driving said sprockets; between said sprockets a drum, a roller mounted on said drum, and a flywheel, said roller and flywheel being driven by the film and independent of said motor, the length of film between said sprockets being free of frictional restraint; and a brake engaging said drum.

3. A mechanism for feeding a sound film past a light beam comprising toothed sprockets for propelling the film; a motor for driving said sprockets; a drum, at the periphery of which the film passes the said beam of light; a fly-wheel and a continuously working brake, both of which are coupled to said drum so as to be driven together with the latter independent of the said motor by the passage of the film over said drum.

4. A mechanism according to claim 3 and in which the brake is applied direct to the drum and the fly wheel is coupled to said drum through the agency of the film.

5. Mechanism for feeding a film past a light beam comprising feeding means and take-up means for propelling the film, a motor for operating said means, a film-supporting roller and a separate flywheel between said film-propelling means, the roller and flywheel being driven by the film independently of the motor, and a brake restraining said roller.

ARNOLD POULSEN.